Aug. 25, 1936.　　　F. A. FABREY　　　2,051,834
SWAB FOR CLEANING MILKING MACHINE INFLATIONS
Filed March 28, 1934
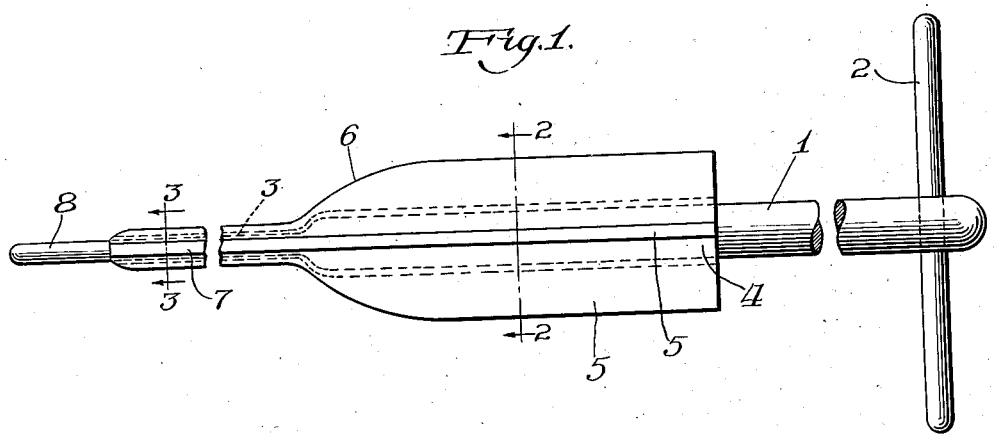
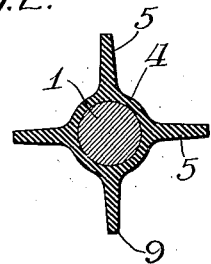
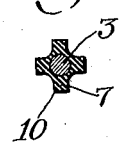
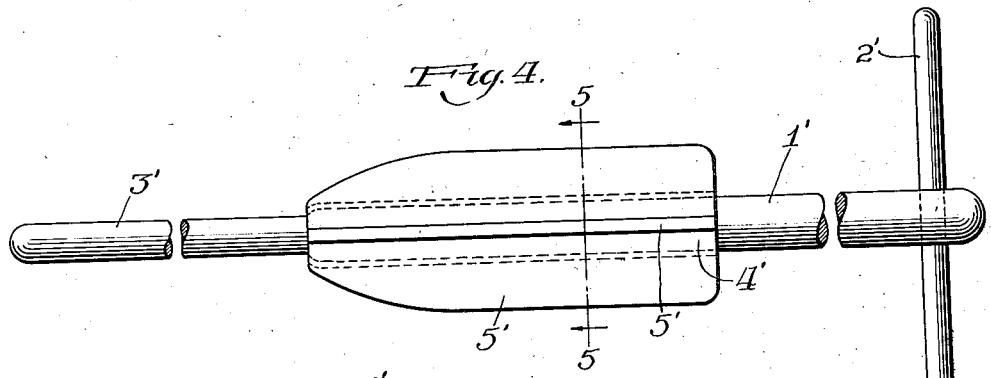
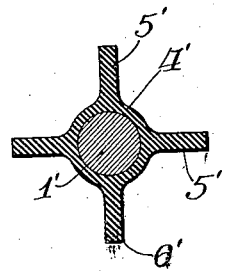
Inventor:
Frank A. Fabrey
By Lee J. Gary
Atty.

Patented Aug. 25, 1936

2,051,834

UNITED STATES PATENT OFFICE 2,051,834

SWAB FOR CLEANING MILKING MACHINE INFLATIONS

Frank A. Fabrey, Passaic, N. J., assignor to Raybestos-Manhattan, Inc., Passaic, N. J., a corporation of New Jersey Application March 28, 1934, Serial No. 717,752

2 Claims. (Cl. 15—213)

This invention relates to improvements in cleaning devices and refers specifically to improvements in a device for cleaning the interior of inflations utilized in conjunction with milking machines.

In utilizing milking machines, difficulty has heretofore been encountered in keeping the interior of the inflations, that is, the devices which are directly attached to the teats of the cow, clean of butterfat and other undesirable accumulations. The inflations, for sanitary reasons, must of necessity be frequently cleaned and in order to remove the accretions of butterfat and the like, the inflations are usually soaked for a period of time in a relatively strong solution of lye. Due to the peculiar shape of the usual inflation, the interior thereof is more or less inaccessible for cleaning and inspection. Further, in view of the fact that the material normally passed through the inflations is a food, not all solvents of butterfat may be used since if even traces of some solvents remained in the inflation, the milk would be ruined.

It has heretofore been proposed to use brushes for cleaning the interiors of inflations having radially disposed bristles. Various objections are inherent in the use of brushes of this type among which may be mentioned, that the bristles, even when new, are not positive enough in their scraping or cleaning action to remove all of the accumulations within the inflation. Of course, when the brush is wet or old this defect is more pronounced. Moreover, the lye used in cleaning has a detrimental action upon the bristles and quickly renders the brush useless for its intended purpose.

My invention, therefore, is directed to the provision of an inflation cleaning device which is positive in its scraping or cleaning action; is as efficient when wet as when dry; the scraping or cleaning members do not take on a permanent set when old or frequently used, as is the case with bristles; and the scraping members are not injuriously affected by lye or the like.

Other objects and advantages of my invention will be apparent from the accompanying drawing and following detail description.

In the drawing, Fig. 1 is a side elevational view, illustrating an inflation cleaning device embodying the concepts of my invention.

Fig. 2 is a sectional view taken on line 2—2 of Fig. 1.

Fig. 3 is a sectional view taken on line 3—3 of Fig. 1.

Fig. 4 is a side elevation view, illustrating a slight modification of my invention.

Fig. 5 is a sectional view taken on line 5—5 of Fig. 4.

Referring in detail to the drawing, 1 indicates a stem which may be constructed of metal or other suitable material and may be of circular cross-section. A handle 2 may be secured to one end of the stem 1 whereby said stem may be conveniently rotated about its longitudinal axis, for a purpose which will be hereinafter more fully described. The stem 1, at its opposite end, may be restricted in cross-section, as shown best at 3 in Figs. 1 and 3.

A flexible rubber or composition sleeve or envelope 4 may be mounted upon and completely embrace a portion of the stem 1, said sleeve or envelope being vulcanized upon the stem or secured thereupon in any other suitable manner. Sleeve 4 may, in general, follow the contour of stem 1 and consequently is reduced in diameter over a predetermined length of the reduced portion 3. Sleeve 4 may carry a plurality of integral, outwardly extending, circumferentially spaced, longitudinal fins or scrapers 5, which gradually taper, as at 6 in Fig. 1, to longitudinal projections 7 at the restricted portion 3. The extreme end 8 of stem 1 is not covered by sleeve 4 and is preferably plated with a non-corrosive metal, or if desired, the entire stem may be constructed of a non-corrosive metal.

The interior cavity of the usual inflation is, in general shaped similar to the outer edges of the fins or scrapers 5 and 7. Consequently, in using my invention, end 8 of stem 1 is inserted in the inflation cavity until the edges of the fins 5 and 7 are brought into snug contact with the cavity walls. The stem is then rotated by means of handle 2, pressure being exerted inwardly toward the cavity, thereby slightly flexing the fins and causing the edges thereof to scrape the walls of the cavity removing foreign accretions and accumulations from the cavity walls. Inasmuch as the edges of the fins play an important part in the removal of the accumulations, said edges are preferably square and sharply defined, as shown best at 9 and 10 in Figs. 2 and 3 respectively.

It is to be understood, of course, that I do not wish to be limited to the specific fin contour shown, since it is within the province of those skilled in the art to construct said fins in conformity with the contour of the cavity of the inflation to be cleaned.

Referring particularly to Figs. 4 and 5, a slight modification of my invention is shown, wherein 1' indicates a stem and 2' a handle for rotating said stem. The opposite end portion 3' of stem 1′ may be of restricted cross-sectional area. A sleeve 4′ constructed of rubber or the like may be mounted upon the enlarged portion of stem 1′, said sleeve being provided with integral outwardly extending, circumferentially spaced, longitudinal fins 5′. The edges of the fins may be shaped as shown in Fig. 4, which may approximate the interior cavity contour of the inflation with which it is adapted to be used. Similar to fins 5 and projections 7, the edges 6′ of fins 5′ may be sharply defined to facilitate the scraping action thereof.

The operation of the device shown in Figs. 4 and 5 is similar to that of the cleaner shown in Figs. 1, 2 and 3, and in similar fashion the contour of the edges of fins 5′ may be changed, as desired, to conform with the type of inflation to be cleaned.

By the expression "rubber sleeve, projection or fin" is meant a sleeve, projection or fin constructed of resilient or soft rubber or similar resilient composition or rubber substitute.

The swab of the present invention meets all of the rigid sanitary requirements for cleaning devices of this character; it is highly superior to swabs heretofore used; and it does a good cleaning job due to the rubbing action of the wings or projecting ribs against the inside walls of the inflation, thereby loosening any deposit that may remain after milking, so that the same can be readily washed away.

As the swabs are molded, the rubber is securely vulcanized to the metal supporting stem. The rubber wings are made of sufficient width and length to make for a snug fit on the inside of the inflation to ensure a good rubbing action.

I claim as my invention:

1. A device for cleaning the inner walls of an inflation which comprises, a supporting stem adapted to be rotated about its longitudinal axis, a rubber sleeve fixedly mounted upon said stem, and a plurality of diametrically opposed, radially extending, elongated rubber projections integrally formed upon said sleeve and extending longitudinally thereof, the outer edges of which are adapted to scraping the walls of an inflation cavity when the stem is rotated, the stem projecting from both ends of the sleeve to center the sleeve within the inflation.

2. A device for cleaning the inner walls of an inflation which comprises, a supporting stem adapted to be rotated about its longitudinal axis, said stem being restricted in cross sectional area adjacent one end thereof relative to the other end, a rubber sleeve embracing said stem including a portion of the stem of restricted cross sectional area, a plurality of superficial spaced longitudinal rubber projections carried by said sleeve, said projections extending a lesser radial distance from the sleeve adjacent the portion of the stem of restricted area than the extent of the projections adjacent the unrestricted portion of the stem whereby the outer edges of said projections conform approximately with the longitudinal sectional contour of an inflation cavity.

FRANK A. FABREY.